(12) United States Patent
Schneeberger et al.

(10) Patent No.: US 12,030,792 B2
(45) Date of Patent: Jul. 9, 2024

(54) RECIRCULATION LOOP REVERSE OSMOSIS SYSTEM WITH STRUCTURALLY FIXED RECOVERY RATE AND STRUCTURALLY STABILIZED FULL FLOW DISCHARGE

(71) Applicant: KATADYN DESALINATION, LLC, Petaluma, CA (US)

(72) Inventors: Johannes P. Schneeberger, Petaluma, CA (US); Michael Anderson, Petaluma, CA (US)

(73) Assignee: KATADYN DESALINATION, LLC, Petaluma, CA (US)

( * ) Notice: Subject to any disclaimer, the term of this patent is extended or adjusted under 35 U.S.C. 154(b) by 0 days.

(21) Appl. No.: 17/737,917

(22) Filed: May 5, 2022

(65) Prior Publication Data

US 2022/0356084 A1 Nov. 10, 2022

Related U.S. Application Data

(60) Provisional application No. 63/184,912, filed on May 6, 2021.

(51) Int. Cl.
*B01D 61/06* (2006.01)
*B01D 61/12* (2006.01)
(Continued)

(52) U.S. Cl.
CPC ............. *C02F 1/441* (2013.01); *B01D 61/06* (2013.01); *B01D 61/12* (2013.01);
(Continued)

(58) Field of Classification Search
CPC .......... C02F 2209/03; C02F 2301/046; B01D 61/06; B01D 61/12
See application file for complete search history.

(56) References Cited

U.S. PATENT DOCUMENTS 6,203,696 B1 3/2001 Pearson
6,299,766 B1 10/2001 Permar
(Continued)

FOREIGN PATENT DOCUMENTS

GB 2356432 A 5/2001
WO 2004016947 A1 2/2004

OTHER PUBLICATIONS

Lee, et al., "Flexible Reverse Osmosis (FLERO) Desalination", Manuscript, Water Technology Research Center et al., Revised Submission: Oct. 8, 2018 (32 pgs).
(Continued)

*Primary Examiner* — Bradley R Spies
(74) *Attorney, Agent, or Firm* — Stinson LLP (57) ABSTRACT

A reverse osmosis desalination system has a combined displacement pump and displacement pressure recovery motor that propagate feed water with a structurally fixed recovery rate and structurally stabilized volume flow through continuously alternating discharging and recirculation intervals. Thereby enabled is an instantaneous discharge of the entire feed water concentrate and unmixed replacement with low salinity source water that intermittingly and effectively flushes the reverse osmosis membranes. This in turn provides for high recirculation peak salinity and recovery rate that are simple and reliably controlled without impairing membrane longevity.

19 Claims, 6 Drawing Sheets

(51) Int. Cl.
*C02F 1/44* (2023.01)
*C02F 103/08* (2006.01)

(52) U.S. Cl.
CPC .... *B01D 2313/18* (2013.01); *B01D 2313/243* (2013.01); *B01D 2313/246* (2013.01); *B01D 2313/48* (2013.01); *B01D 2315/20* (2013.01); *C02F 2103/08* (2013.01); *C02F 2209/006* (2013.01); *C02F 2209/02* (2013.01); *C02F 2209/03* (2013.01); *C02F 2209/05* (2013.01); *C02F 2209/44* (2013.01); *C02F 2301/046* (2013.01); *C02F 2303/16* (2013.01)

(56) References Cited

U.S. PATENT DOCUMENTS

| | | | |
|---|---|---|---|
| 7,910,004 | B2 | 3/2011 | Cohen et al. |
| 8,021,128 | B2 | 9/2011 | Pearson |
| 9,790,113 | B2 | 10/2017 | Cohen et al. |
| 10,569,222 | B2 | 2/2020 | Cohen et al. |
| 10,576,428 | B2 | 3/2020 | Cohen et al. |
| 2006/0254981 | A1* | 11/2006 | Efraty ............ B01D 61/025 210/652 |
| 2010/0270237 | A1* | 10/2010 | Efraty ............ B01D 61/025 210/637 |
| 2010/0292844 | A1 | 11/2010 | Wolf |
| 2012/0305459 | A1 | 12/2012 | Takabatake et al. |
| 2013/0126430 | A1 | 5/2013 | Kenley et al. |
| 2015/0239752 | A1 | 8/2015 | Tulloch |
| 2017/0209834 | A1 | 7/2017 | Cohen et al. |
| 2018/0290902 | A1 | 10/2018 | Aronson et al. |

OTHER PUBLICATIONS

International Search Report and Written Opinion for related PCT Application PCT/US2022/027939 dated Jul. 27, 2022 (12 pgs).

* cited by examiner

RECIRCULATION LOOP REVERSE OSMOSIS SYSTEM WITH STRUCTURALLY FIXED RECOVERY RATE AND STRUCTURALLY STABILIZED FULL FLOW DISCHARGE

CROSS-REFERENCE TO RELATED APPLICATIONS

This application is based on and claims priority to U.S. Provisional Application Ser. No. 63/184,912, filed on May 6, 2021, which is incorporated herein by reference in its entirety.

BACKGROUND OF THE INVENTION

1. Field of the Invention

The invention described herein relates to a reverse osmosis system with a recirculation loop.

2. Description of Related Art

Recirculation loops are commonly utilized in reverse osmosis ("RO") systems to control and/or increase the rate at which purified product water can be extracted from a source water.

Prior art RO systems commonly utilize independent energy recovery units, which have a fluid connection between the RO feed water and RO return water with unavoidable mixing between them. As a result, during intermittent discharge in the RO recirculation loop, highly concentrated brine becomes diluted with low concentrate feed water immediately prior to its discharge. This substantially limits a maximum concentration of the discharged brine and thus the overall recovery rate of any recirculating RO system.

RO membranes are susceptible to well-known mineral deposits and scaling from dissolved salts in the feed water. As salt concentration in the boundary layers adjacent the membrane surfaces rise above critical levels, the salts start to deposit on the membrane surfaces, thereby inhibiting the membrane's ability to extract purified water. The deposited salts may eventually crystallize and harden. Scaling susceptibility in membranes is a key limiter in increasing product water recovery rates in RO systems employing recirculation loops.

Prior art recirculating RO systems commonly rely on complex control systems including a multitude of sensors as well as complex processing and control algorithms. Contrary to that, RO systems may be deployed in rugged operating conditions and be operated by minimally trained staff. In addition, the high salinity environment in such RO systems requires extensive protective effort for sensors and electronics increasing the overall system costs. Moreover, such complex control systems may have a tendency to build up oscillations in their control outputs that limit rates of change and maxima in RO operating pressure and salinity. This in turn limits maximum recovery rates at which purified product water may be extracted from a source water as well as maximum salinity change during concentrate discharge, which in turn may limit intermittent flushing opportunity of the RO membranes in between salinity buildup of the recirculating feed water.

Prior art recirculating RO systems commonly rely on passive energy recovery devices that are structurally separate from the pump employed to bring the feed water up to the pressures needed for the purified water to pass through the RO membranes. At the same time, such pumps need to provide sufficient volume throughput for the pressurized feed water to move along the membrane surfaces with sufficient speed and turbulence to minimize feed water salinity build up immediately adjacent the membranes. This may consume extensive energy with which such pump needs to be powered. In cases of feed water having a salinity marginally above limits of drinking water, it may need to be recirculated multiple times across the membranes before its salinity is high enough for discharge. Every time the feed water is looped through, it has to be pressurized and again depressurized. As a result, the efficiency in pressurizing and pressure energy recovering of the recirculating feed water becomes a key factor of the overall operating costs of such recirculating RO system.

With the advance of solar power, recirculating RO systems are increasingly desired to be capable to operate efficiently at wide range of environmentally scheduled electricity that is fluctuating throughout the day. Centrifugal pumps commonly employed in prior art recirculating RO systems operate efficiently only within a power range that may be only a fraction of a solar panel power delivery spectrum between sunrise and sunset. Displacement pumps to the contrary, have a substantially wider efficient operating range then centrifugal pumps.

Source water contents of dissolved solids may vary greatly especially for well water or any other non-oceanic water source. On the other hand, well known reverse osmosis membranes along which pressurized water is passed to extract across them the purified water, have commonly optimal operating pressure ranges.

Fluctuation in feed water salinity concentration may improve the performance and longevity of commercially available reverse osmosis membranes, resulting in purer product water with less remaining dissolved solids than with constant water salinity concentration.

Figure 1:
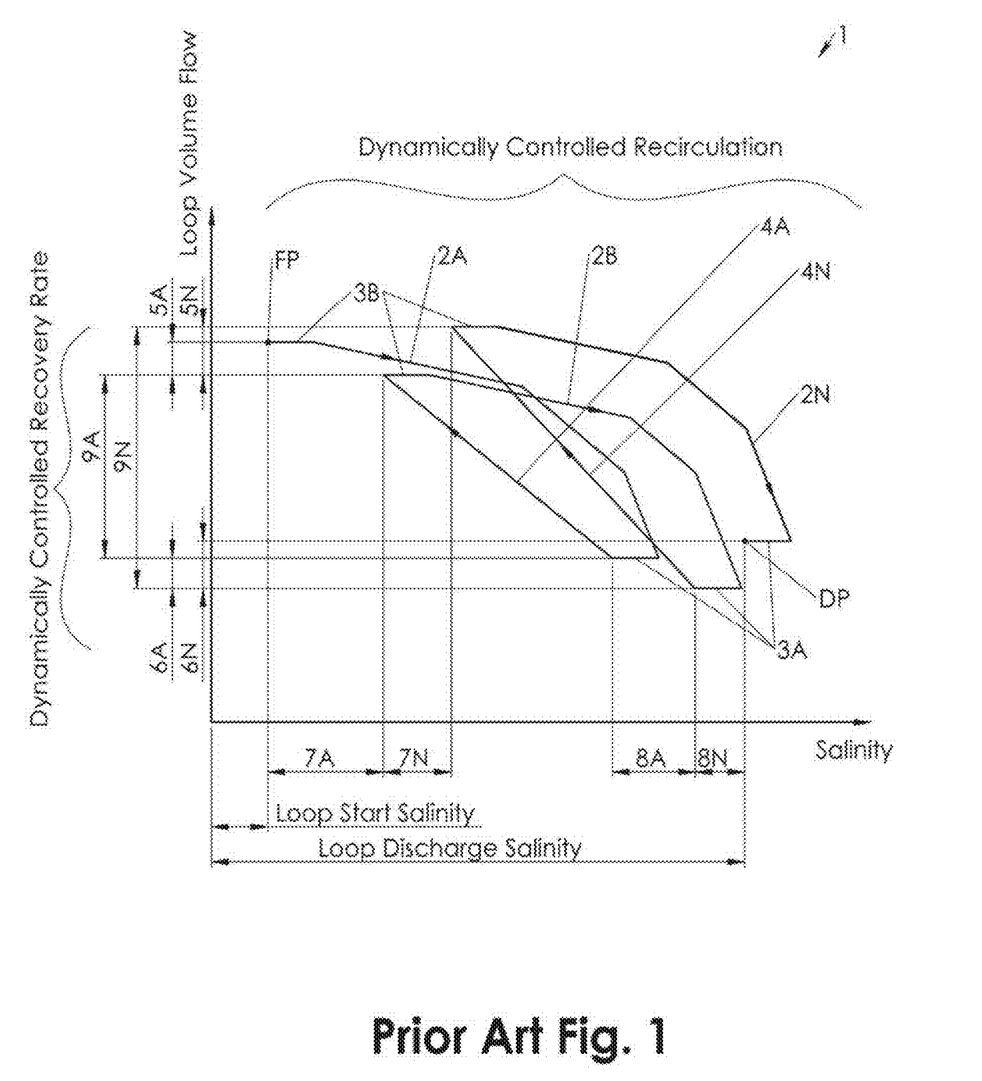
FIG. 1 is a simplified graph of salinity over volume flow during recirculation of a prior art recirculation loop desalination system with dynamically controlled recovery rate. Proportions are depicted for the purpose of general understanding without claim of accuracy.

Referring to Prior Art FIG. 1, a well known prior art reverse osmosis system 1 with dynamically controlled recovery rate may include a well known rotary energy recovery device that transfers fluid pressure from a returning feed water onto fresh feed water before it is passed on to a well known membrane array. Such rotary energy recovery device may induce a certain feed water mixing 3B and return water mixing 3A between them such that the salinity of the returning water decreases while the salinity of the feed water increases.

Purified product water separation 2A, 2B, 2N with concurrent volume flow decrease and salinity increase in the feed water takes place as the feed water passes through the RO membrane(s) at the high pressure side. This is followed by source water replenishing 4A, 4N on the low pressure side, which brings the volume flow within the recirculation loop back up while the salinity drops down again. As the salinity in the source water is higher than that of the extracted product water, the average salinity in the recirculating feed water gradually increases as is well known in the art.

Prior art recirculation loop systems, such as the reverse osmosis system 1 shown in FIG. 1, with dynamically controlled recovery rate need to adjust speed and/or power supply in case a centrifugal pump is employed to induce the water flow through the recirculation loop. As the salinity builds up in the recirculation loop, so does the pressure for a targeted continuous product water flow. As membrane arrays tend to oscillate between them in their production rate and the high pressure side may develop a certain structural elasticity in response to water pressure changes, a dynamically controlled recovery system may tend to build up pressure and/or volume flow oscillations with increasing salinity and RO membrane operating pressures. Also, the mixing behavior of a rotating energy recovery device may also oscillate, additionally contributing to variations of lower and upper salinity increments 7A/7N, 8A/8N. These together with the volume flow oscillations may result in lower and upper volume flow variations 6A/6N, 5A/5N and consequently a varying supply water flow 9A/9N as the recirculation loop is shut off from discharge. These variations may become increasingly difficult to control as the salinities and the pressure in the high pressure portion during the purified product water separation 2A/2B/2N of the recirculation loop increase.

Figure 2:
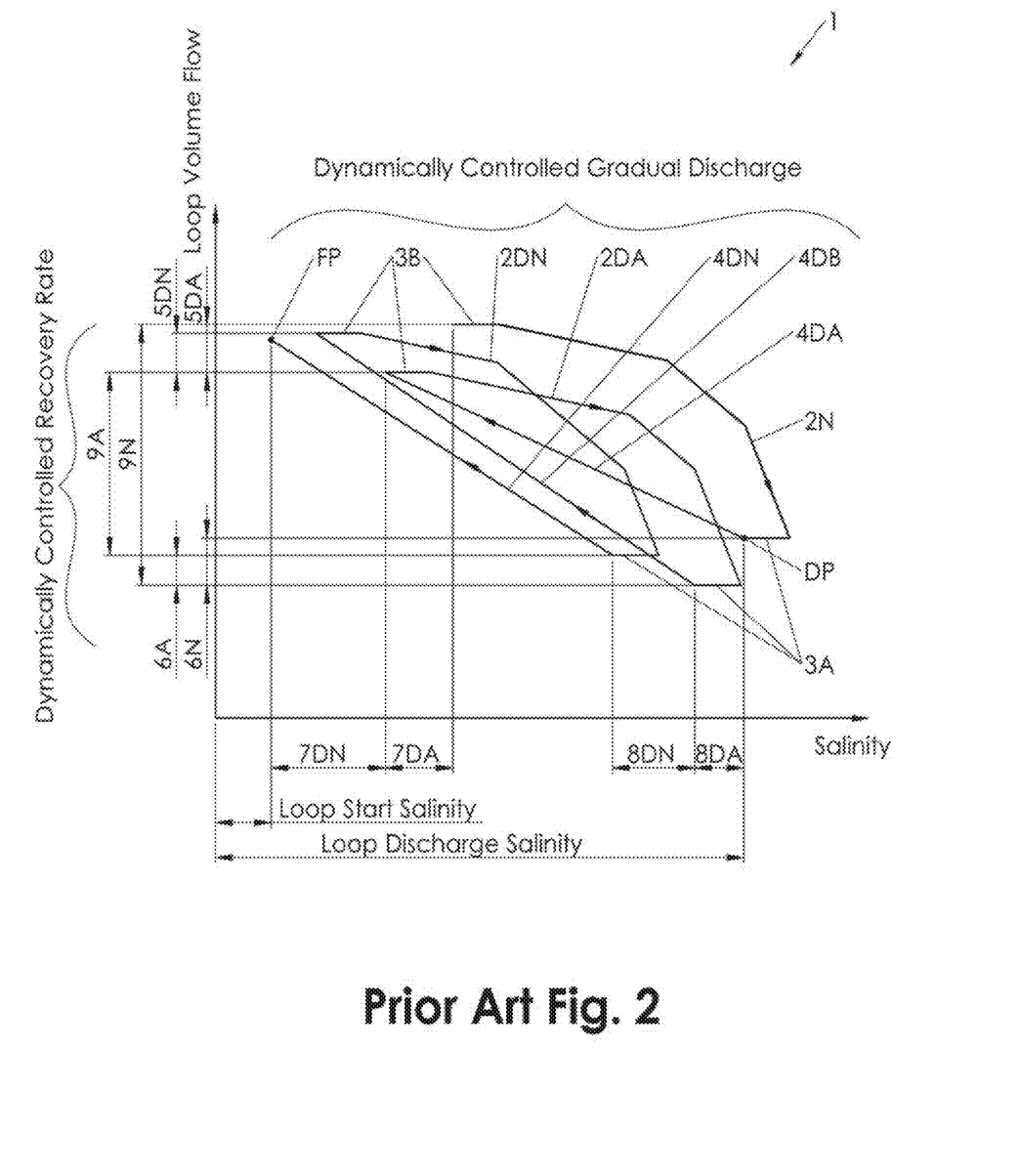
FIG. 2 is a simplified graph of salinity over volume flow during concentrate discharge of the prior art desalination system of Prior Art FIG. 1. Proportions are depicted for the purpose of general understanding without claim of accuracy.

According to Prior Art FIG. 2 and once predetermined discharge salinity level DP in the recirculating feed water is detected, a portion of the concentrated recirculation feed water may be gradually discharged in amounts sufficiently small such that the control system can keep up with the change of salinity and RO membrane pressure. Source water discharge replenishing 4DA, 4DB, 4DN replaces not only extracted product water but also discharged concentrate resulting in the overall salinity to drop again gradually within the recirculation loop. As the mixed supply water is in a flush beginning pass 2DA through the membrane array a certain portion of purified product water is again separated while pushing the residual concentrate out. Eventually, the salinity of the recirculating feed water may reach again a predetermined low salinity level FP after a final down mixing pass 2DN resulting in a Flush End Salinity at the exit of the last membrane in the array. Fluctuating variables 5A/5N, 6A/6N, 7A/7N, 8A/8N, 9A/9N, described under Prior Art FIG. 1, may in the same way affect accurate control of the discharge cycle. The gradual discharge of concentrate already diluted with source water may be further diluted during pressure recovery or return water mixing 3A. As an unfavorable result, efforts in the Prior Art of maximizing salinity in the feed water during recirculation are again reduced by the gradual discharge and its affiliated concentrate dilution with source water as well as eventual pressure recovery or return water mixing 3A. Consequently, and as taught in prior art literature, discharge salinity level DP of no more than about 5 times a source water salinity of below 3000 ppm and recovery rates of no more than 75% are documented, as known to the inventors at the time of filing this application.

BRIEF SUMMARY OF THE INVENTION

A recirculation loop RO system in accordance with at least one embodiment of the invention described herein includes a displacement pump with integrated displacement type energy recovery. In particular, one or more dual acting pistons may be employed in such a combined pumping and recovery device. Such dual acting piston may be actuated on its back side via a piston rod that has a cross section area in a predetermined proportion to a cylinder cross section within which the piston is being moved back and forth. With its front side, the piston may be pressurizing the feed water while simultaneously it may be receiving pressure from the returning water on its back side. The proportion between cylinder cross section area and piston rod cross section area defines in a structurally fixed manner the recovery rate at which purified water is extracted by the membranes from the feed water every time it is passed through them. The combined pumping and pressure recovering device may be driven at a predetermined speed by a motor resulting in a substantially fixed feed water flow rate independently of the feed water pressure on the RO membrane side. As the feed water is circulated through, a certain portion of the feed water is recovered by the membranes. As this recovery rate is structurally fixed by the cross section area of piston cylinder and piston rod, the pressure adjusts automatically on the RO membrane side to a level at which the membranes provide purified product water for that fixed recovery rate. In a recirculation loop with closed discharge, the product water extracted by the membranes is replenished by feed water entering on the low pressure side of the recirculation loop. As the purified water extracted by the membrane(s) has a salinity substantially lower than the feed water replenishing the recirculating feed water in the same amount, the overall salinity in the recirculating loop gradually increases. As is well-known in the art, the purified water extraction rate of a RO membrane for a given feed water salinity, feed water temperature and feed water flow rate across is dependent on the feed and product water pressure difference. At a given feed water temperature, the feed water pressure thus increases in conjunction with feed water salinity in a predetermined fashion in a recirculation loop with fixed flow rate. This may be favorably utilized in the recirculating RO system described herein by employing a pressure sensor or pressure switch that may be preset to switch at a pressure level of the feed water that corresponds to a predetermined salinity level in the high pressure portion of the recirculation loop. The pressure switch may actuate, via a power relay, a solenoid valve positioned along the low pressure side of the recirculation loop prior to a check valve and a source water supply port with respect to the flow direction within the recirculation loop.

Once the predetermined salinity is reached, the discharge valve is instantaneously opened to the extent that the pressure along the recirculation loop between the check valve and the energy recovery exit drops below a source water inlet pressure. As a consequence, the check valve closes and prevents any source water to short circuit into the discharge while at the same time concentrated feed water is prevented from continuing to recirculate but all of it being discharged without any dilution. Instead of a two-way valve and the check valve, a three way valve may be employed that switches between a recirculation bridge of the recirculation loop and a discharge line.

The recirculation is completely interrupted during discharge. Only source water is entering as the RO membranes continue to extract purified product water at the rate that is structurally fixed within the combined displacement pump and displacement recovery motor. This causes a sharply defined front of pure source water with its comparatively low salinity to progress through the pump and into the RO membrane(s). The duration of discharge may be predetermined in conjunction with the known water volume of the recirculation loop and volume flow defined by the displacement pump's speed such that only the unmixed high concentrated brine may be discharged across the solenoid valve after exiting the last RO membrane. As a favorable result, substantially the entirety of the high concentrated feed brine may be instantaneously replaced by low salinity feed water resulting in a maximum salinity drop of the water progressing through the RO membrane(s). This pronounced intermittent cleansing flush of the membrane(s) may greatly assist in the dissolving and removal of any salt and/or minerals that may have started to deposit during the immediately prior recirculation period and salinity build up. As a result, the feed water may be recirculated to salinity levels substantially higher than that of prior art RO systems utilizing similar RO membranes. As another favorable result, the recovery rate of product water may be brought substantially higher and the percentage of residual concentrate substantially lower than in prior art recirculating RO systems.

In contrast to conventional recirculating RO systems, the recirculating RO systems and methods described herein may operate without any substantial feed and return water mixing within the recirculation loop in order to maximize the concentration of the discharged brine and overall recovery rate of the system and method. Further, the recirculating RO systems and methods described herein may provide an intermittent cleansing flush, as described above, to counteract scaling mechanisms in RO membranes at ultrahigh salinity of the recirculating feed water to increase product water recovery rates. In addition, the recirculating RO systems and methods described herein may be capable of stable operation under wide conditions with minimal need for sensors and logic control circuitry in order to be more suitable for operation under rugged conditions and in a high salinity environment. The recirculating RO systems and methods described herein may further directly utilize the recovered feed water pressure to pressurize the water undergoing pressurization in order to keep system efficiency to a maximum and reduce overall operating costs. Further, the recirculating RO systems and methods described herein are particularly suited to utilize displacement type pumping and integrated energy recovery with structurally fixed recovery rates. Still further, the recirculating RO systems and methods described herein may be controlled in a simple and reliable fashion while adhering to optimum operating pressure ranges of reverse osmosis membranes. In addition, the recirculating RO systems and methods described herein may operate for any given source water salinity with a feed water salinity across the reverse osmosis membranes that is continuously oscillating between predetermined upper and lower feed water salinity levels.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

Prior Art

Prior Art

DETAILED DESCRIPTION OF EXEMPLARY EMBODIMENTS

Unlike the prior art systems described above and shown in Prior Art FIGS. 1 and 2, which have no more than about a 5:1 ratio of discharge salinity level DP to source water salinity, the recirculation loop reverse osmosis systems 10A, 10B described below and shown in FIGS. 3-6 have been tested to have a ratio of above 25:1 of discharge salinity level to source water salinity for a source water salinity of about 3000 ppm, resulting in a recovery rate of more than 97%.

Figure 3:
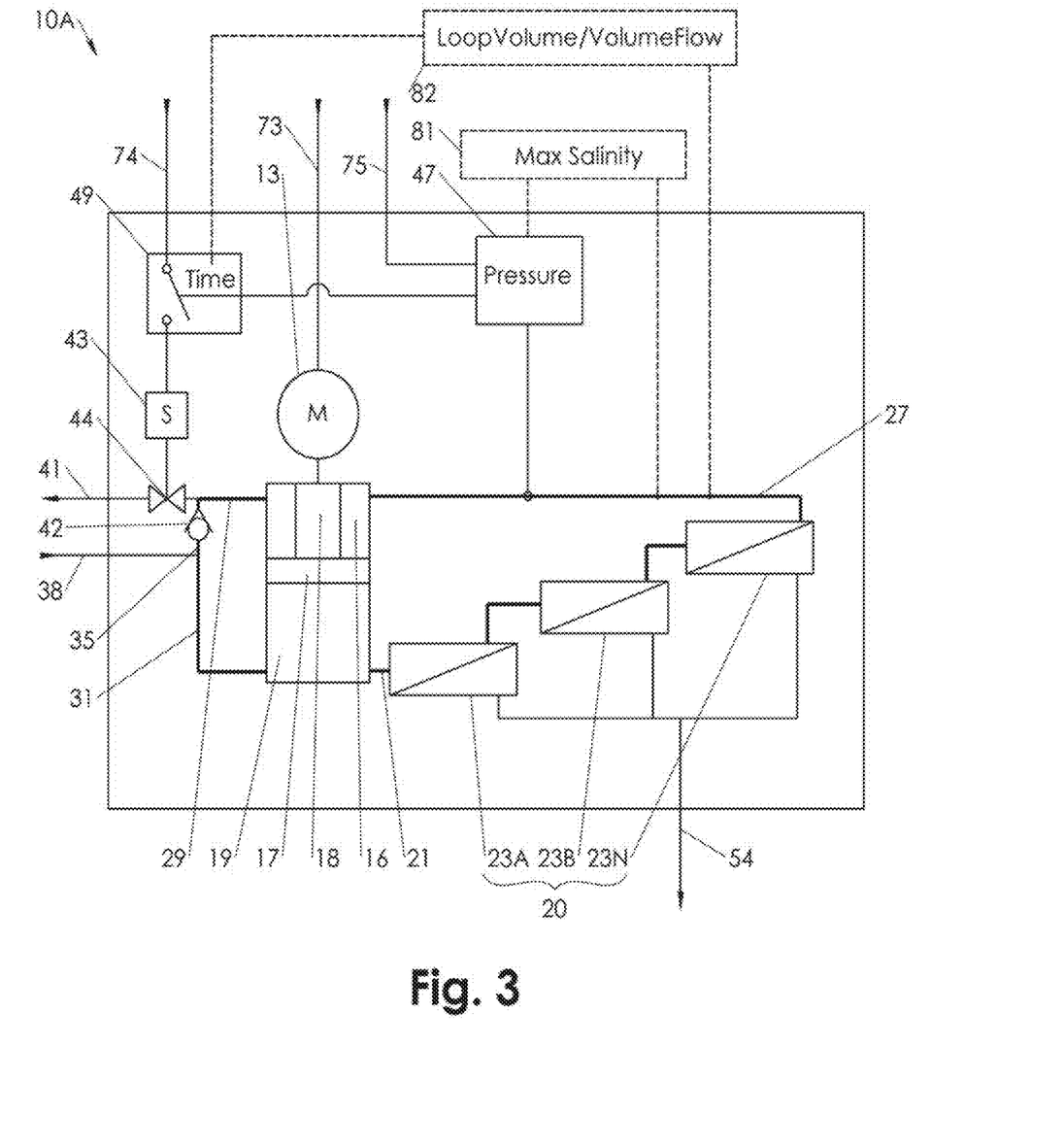
FIG. 3 is a simplified schematic of a recirculation loop reverse osmosis system in accordance with a first embodiment of the invention described herein.

Referring to FIG. 3, a first embodiment of a recirculation loop reverse osmosis system 10A recirculates feed water along a recirculation loop 31, 21, 27, 29, 35 with a number of reverse osmosis membranes 23A, 23B, 23N of a membrane array 20 being interposed along a high pressure portion 21, 27 of the recirculation loop 31, 21, 27, 29, 35. The recirculation loop 31, 21, 27, 29, 35 includes a low pressure portion 31 between a source water line 38 and a displacement pump 19, a high pressure portion 21 between the displacement pump 19 and the membrane array 20, a high pressure portion 27 between the membrane array 20 and a displacement motor 16, a low pressure portion 29 between the displacement motor 16 and a two way valve 44, and a low pressure portion 35 extending from the low pressure portion 29 to a source water line 38. The recirculation loop 31, 21, 27, 29, 35 also encompasses the volumes within the displacement pump 19, membrane array 20, and displacement motor 16 through which the feed water flows as it recirculates through and between the portions of the recirculation loop 31, 21, 27, 29, 35. It is also within the scope of the invention for the recirculation loop 31, 21, 27, 29, and 35 to have more or less portions than described above and shown in the Figures. The scope of the invention is further applicable to any well-known RO membrane arrangement.

Across the reverse osmosis membranes 23A, 23B, 23N purified product water is extracted and collected via product line 54 as is well known in the art. The extracted product water is replenished by a source water externally supplied at a source water entrance via a source water line 38 connecting to a low pressure portion of the recirculation loop 29, 35, 31. The source water line 38 is following a discharge line 41 with respect to a flow direction of the recirculation loop 31, 21, 27, 29, 35.

Interposed between and pressure wise separating the low pressure portion of the recirculation loop 29, 35, 31 and the high pressure portion of the recirculation loop 21, 27 is a combined displacement pump 19 and displacement motor 16, which is pressurizing the feed water prior to entering and advancing it into the high pressure portion of the recirculation loop 21, 27 while simultaneously recovering the residual pressure of the feed water exiting the high pressure portion of the recirculation loop 21, 27 and advancing it into the low pressure portion of the recirculation loop 29, 35, 31.

The combined displacement pump 19 and displacement motor 16 is preferably configured with a double acting piston 17 that displaces on its front face a first volume between its oscillating dead ends thereby pumping the feed water through in conjunction with inlet and outlet valves as is well known in the art. Via its back side, the piston 17 may be actuated by piston rod 18 having a cross section area in a predetermined proportion to the cylinder cross section area within which the piston 17 is moving back and forth. The piston 17 back face displaces a second volume accessed by the feed water exiting the high pressure portion in conjunction with actuated inlet and outlet valves. This results in an actuation of the piston 17 back face and motoring of the piston 17 while recovering the pressure of the residual feed water exiting the high pressure portion of the recirculation loop 21, 27. As the piston 17 oscillates in a sealed manner, the feed water entering and exiting the high pressure portion of the recirculation loop 21, 27 is substantially free of mixing. This contributes to an undiluted and efficient recirculation between high pressure portion of the recirculation loop 21, 27 and low pressure portion of the recirculation loop 29, 35, 31 and an overall efficient operation of the system 10A, and also system 10B shown in FIG. 4.

Figure 4:
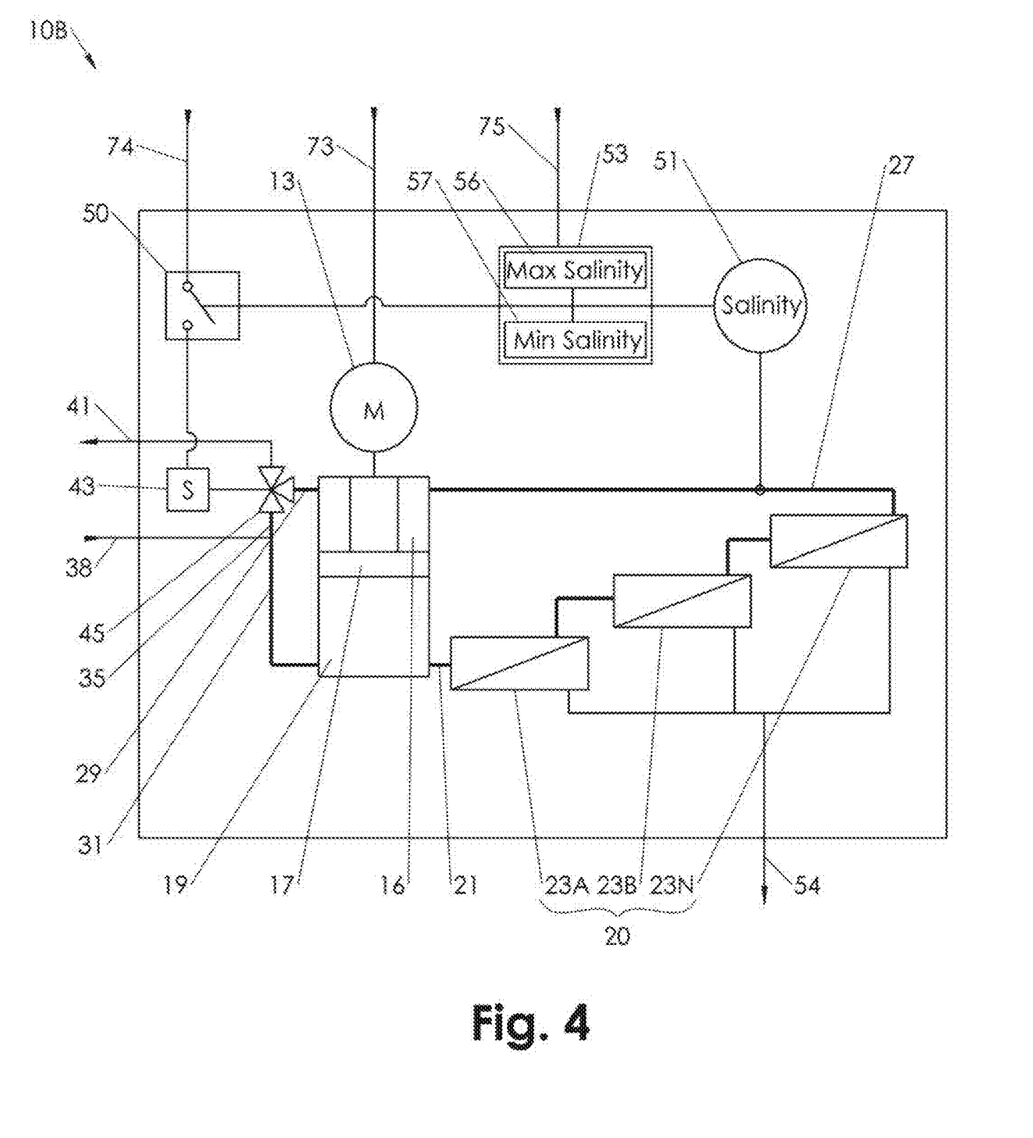
FIG. 4 is a simplified schematic of a recirculation loop reverse osmosis system in accordance with a second embodiment of the invention described herein.

For a given operating speed at which the combined displacement pump 19 and displacement motor 16 are driven by a motor 13, the volume flows and volume flow difference between recirculation loop high pressure portion 21, 27 entering and exiting feed water is structurally defined by the proportion cylinder cross section area and piston rod 18 cross section area. This structurally defined volume flow difference favorably results on one hand in a structurally defined and fixed recovery rate at which product water is being forced out across the membrane array 20 to compensate for the reduced volume flow through the displacement motor 16. In addition, feed water propagation along the recirculation loop 31, 21, 27, 29, 35 and product water extraction rate thus take place in a highly stabilized manner and independently of eventual pressure fluctuations in the high pressure portion 21, 27 that may occur at a given volume flow and a changing feed water salinity and/or changing feed water temperature as may be clear to anyone skilled in the art. This is a prerequisite for an efficient, simple, robust and reliable operation of the systems 10A, 10B with minimum control effort up to recovery rates of above 97% from an up to about 3000 ppm salinity source water, a feed water salinity in the recirculation loop of at least up to 50000 ppm but preferably up to above 75000 ppm, and an operating pressure of the recirculation loop high pressure portion 21, 27 of above 500 psi and up to above 1000 psi.

Further part of the systems 10A, 10B may be a feed water sensor 47 (FIG. 3), 51 (FIG. 4) that senses a feed water condition such as pressure and/or salinity and a feed water discharger such as a two way valve 44 or a three way valve 45 preferably actuated by but not limited to a solenoid 43. In response to the feed water sensor 47/51 sensing a feed water condition matching a concentrate discharge start parameter, the valve 44/45 discharges the feed water exiting the pressure recovery displacement motor 16. The concentrate discharge start parameter may be a reverse osmosis peak operating pressure and/or a reverse osmosis peak operating salinity. The valve 44/45 is again interrupting the discharge of the feed water directly in response to either concentrate discharge stop parameter such as discharge time interval being met or in response to the feed water sensor 47/51 sensing the feed water condition matching the concentrate discharge stop parameter such as a reverse osmosis bottom operating pressure and/or reverse osmosis bottom operating salinity.

Preferably, substantially the entire upstream feed water volume up to the source water line 38 is discharged thereby without any dilution with the following source water. The concentrated feed water is thereby exiting the pressure recovery displacement motor 16 with a reverse osmosis peak salinity that has accumulated in the feed water after exiting the last reverse osmosis membrane 23N.

In case of system 10A, the concentrate discharge start parameter may be a predetermined reverse osmosis peak operating pressure of the membrane array 20, which may be correlated to a maximum salinity 81 in the feed water at a structurally defined feed water volume flow in conjunction with a predetermined feed water temperature as may be clear to anyone skilled in the art. Thus, at a given speed of the motor 13 that may receive an AC power 73 at a given driving AC frequency, the feed water sensor 47 in its preferred configuration as an adjustable pressure switch may be set to switch through a control voltage 75 onto a relay 49, which in turn may connect through an actuation current 74 onto the solenoid 43. The solenoid 43 in turn may mechanically actuate the valve 44/45 to open it.

In case of system 10A, the concentrate discharge stop parameter may be a time interval that is predetermined in conjunction with the water volume of the flushable portion 31, 21, 27, 29 of the recirculation loop 31, 21, 27, 29, 35 divided by the structurally defined volume flow at a predetermined operating speed of the combined displacement pump 19 and displacement motor 16. The water volume of the flushable portion of the recirculation loop includes the volume of the water within the combined displacement pump 19 and displacement motor 16 and within the membrane array 20. As a favorable result, the time interval may come to its end before any source water reaches the discharge line 41. At that moment, the time delay relay 49 disconnects the solenoid 43 from the actuation current 74 and the valve 44/45 may close again before any of the following low salinity source water reaches the valve 44/45. As the low salinity source water replaces the concentrated feed water substantially without any mixing, a sharp drop of salinity and consequently operating pressure may occur in the high pressure portion of the recirculation loop 21, 27. Nevertheless and due to the stabilized volume flow facilitated by the defined motor 13 speed driving the combined displacement pump 19 and displacement motor 16, the sharp pressure drop does not affect the volume flow. This is a prerequisite for the instantaneous discharge of the entire concentrated feed water flow while maintaining stable system operation. In addition and in case of system 10A embodiment, a simple time interval controlled discharge period suffices, which may be without any need for a logic control as should be clear to anyone skilled in the art.

In case of a two way valve 44 being employed, a check valve 42 may be interposed along a recirculation bridge 35 of the recirculation loop between discharge line 41 and the source water line 38 to prevent any of the source water short circuiting along the recirculation bridge 35 into the discharge line 41. In case of the three way valve 45, the feed water flow is instantaneously and alternately switched between discharge line 41 and recirculation bridge 35 without any need for check valve 42.

The second embodiment system 10B in FIG. 4 may feature a feed water sensor 51 that measures the feed water conductivity as it correlates to its salinity in a well known fashion. A concentrate discharge start parameter 56 and a concentrate discharge stop parameter 57 may be stored as voltage levels within a well known comparator 53 that compares them with a voltage received from the conductivity sensor in response to a measured feed water salinity. The moment the received sensor voltage matches the stored maximum salinity voltage information associated with the concentrate discharge start parameter 56, the comparator 53 passes the control voltage 75 onto a direct acting relay 50 that in turn passes through an actuation current 74 to the solenoid 43 to open the valve 44/45. The moment the received sensor voltage matches the stored minimum salinity voltage information associated with the concentrate discharge stop parameter 57, the comparator 53 interrupts the control voltage again. This causes the relay 50 to disconnect again the actuation current 74 from the solenoid 43 and the valve 44/45 closes again. As should be clear to anyone skilled in the art, the on/off switching of relays 49/50, solenoid 43 and valves 44/45 as taught for systems 10A, 10B may be inverted while at the same time providing the described concentrate discharging.

Figure 5:
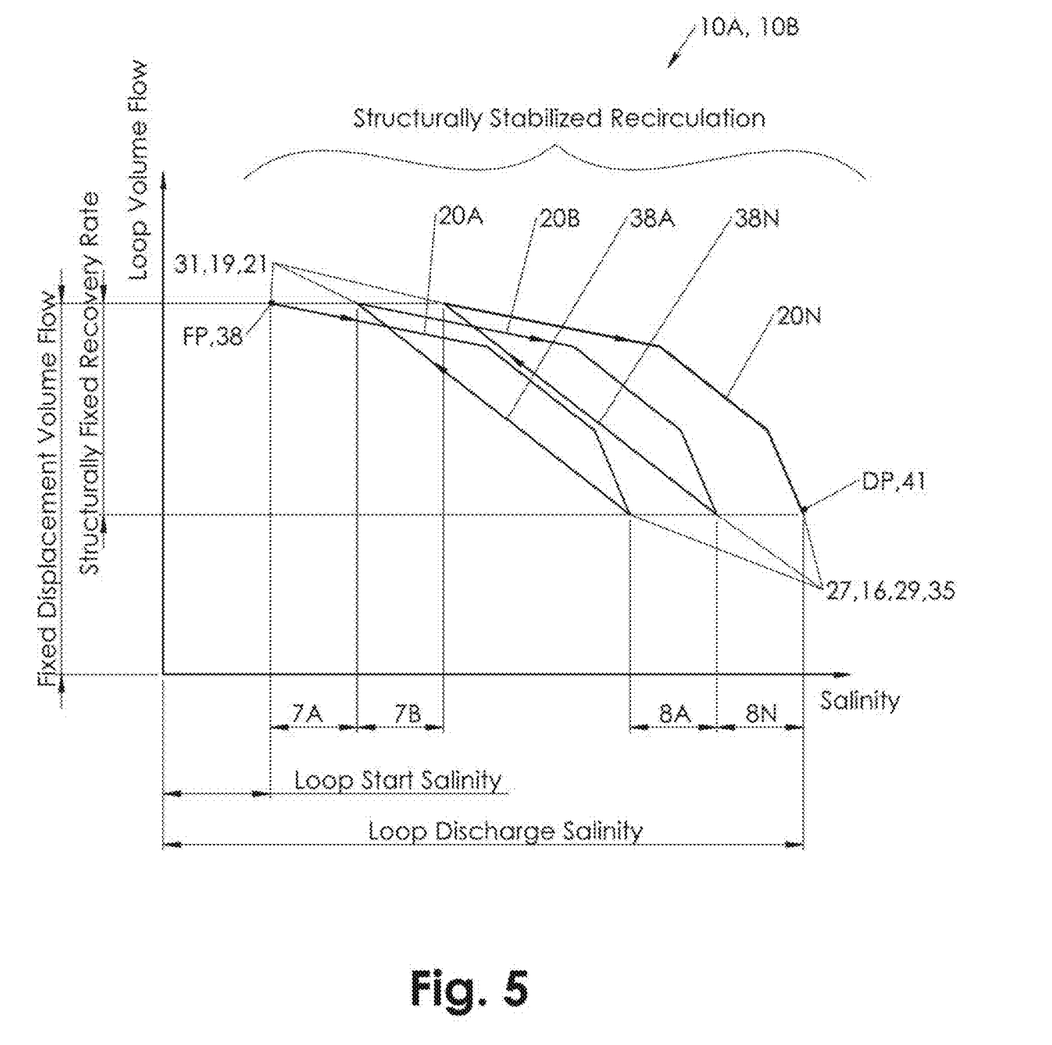
FIG. 5 is a simplified graph of salinity over volume flow during recirculation of the recirculation loop reverse osmosis systems of FIG. 3 and FIG. 4. Proportions are depicted for the purpose of general understanding without claim of accuracy.
Figure 6:
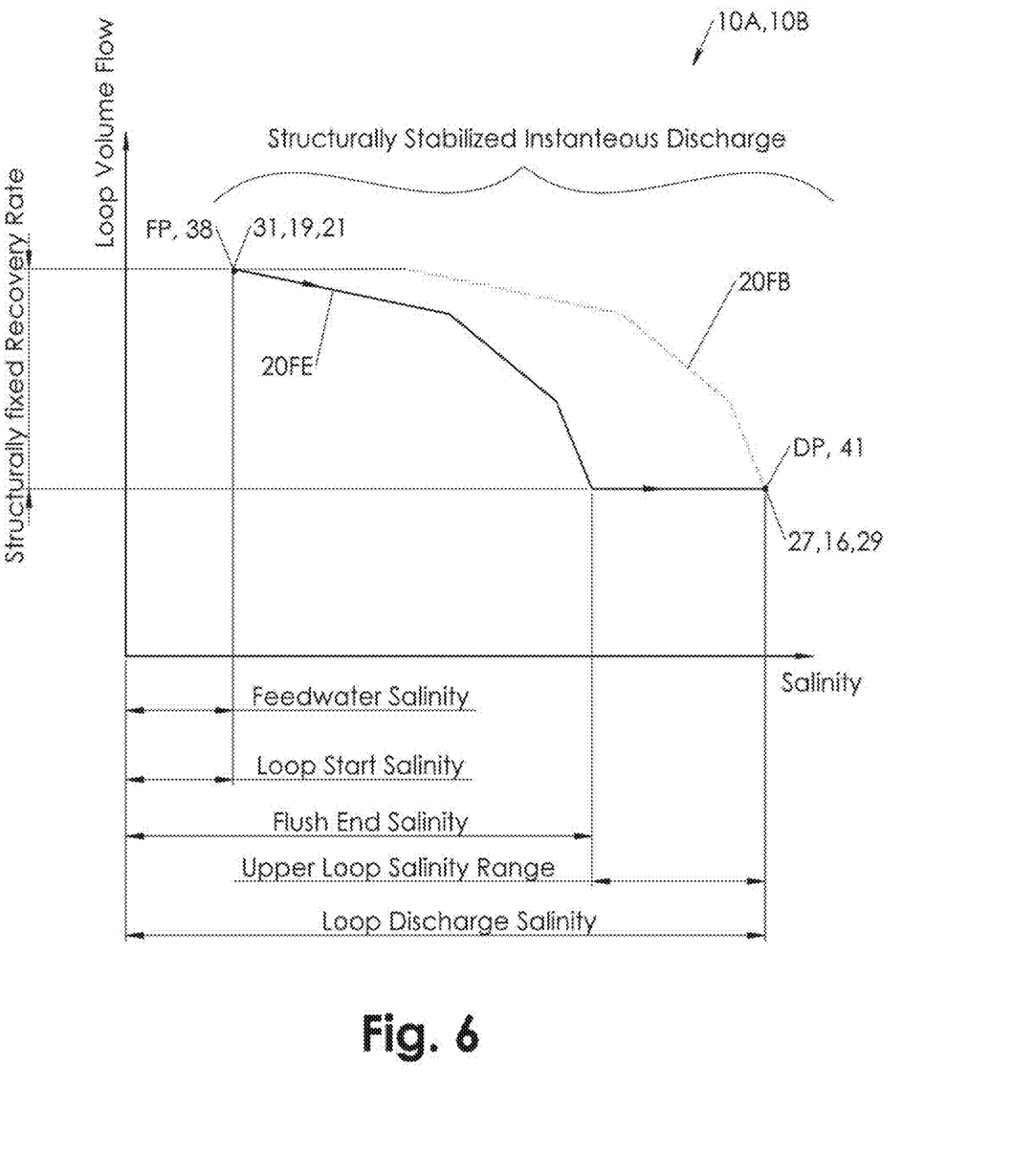
FIG. 6 is a simplified graph of salinity over volume flow during concentrate discharge of the recirculation loop reverse osmosis systems of FIG. 3 and FIG. 4. Proportions are depicted for the purpose of general understanding without claim of accuracy.

Referring to FIGS. 5, 6 and to the above described method for recovering a portion of purified water from feed water via one or more reverse osmosis membranes 23A, 23B, 23N, the method features in essence the following steps of firstly recirculating in a flow direction a feed water along the low pressure portion 29, 35, 31 and the high pressure portion 21, 27 of the recirculation loop 31, 21, 27, 29, 35. This is indicated by high pressure product water extraction periods 20A, 20B, 20N the recirculating feed water is experiencing. Secondly, pressurizing the feed water within the displacement pump 19 prior to it entering the high pressure portion 21, 27 in a substantially structurally fixed proportion to a pressurization speed at which the displacement pump 19 is driven by the motor 13. Thirdly, pressure harvesting the feed water exiting the high pressure portion 21, 27, whereby the exiting feed water is in a volume fraction that is structurally fixed by the ratio of cylinder cross section area within which is moving the piston 17 and of the cross section area of the piston rod 18.

During the pressure harvesting, a volume flow difference between the feed water pumped into the high pressure portion 21, 27 and the feed water exiting it is being forced as purified product water across the number of membranes 23A, 23B, 23N as indicated by product water extraction periods 20A, 20B, 20N. While a volume of the purified product water is being extracted on the high pressure portion 21, 27, the same fixed volume of source water is forced into the low pressure portion 29, 35, 31, to replenish it again. This is indicated by replenishing periods 38A, 38N the recirculating feed water is experiencing. These steps repeat until a discharge condition, e.g., discharge salinity level DP, of the feed water within the recirculation loop 31, 21, 27, 29, 35 in general and within the high pressure portion 27 in particular may be met. Due to the structurally fixed displacement volume flow and structurally fixed recovery rate, upper salinity increments 8A, 8N and lower salinity increments 7A, 7B are consistent between loop start salinity and loop discharge salinity.

At the discharge initiation moment, the recirculation steps above are replaced by a discharge period during which the feed water in its entirety may be discharged as depicted in FIG. 6. During that discharging step, the volume flow difference being forced out as purified product water and the discharged concentrated feed water are being replenished by source water along source water line 38 at the beginning of recirculation loop low pressure portion 31, which at that moment is also the beginning of the now interrupted recirculation loop 31, 21, 27, 29 with respect to the flow direction within it. As the entire concentrated feed water is directed into the discharge line 41, a front of low salinity source water is entering in the interrupted recirculation loop 31, 21, 27, 29 and is progressing through it. The salinity is thereby dropping along the interrupted recirculation loop 31, 21, 27, 29 from an initial high flush begin salinity level 20FB to a flush end salinity level 20FE preferably in a single pass. This discharge step continues preferably until the low salinity source water front has passed through the membrane array 20 and before it reaches the discharge line 41. That way, flushing effect on the membrane is maximized with lowest salinity source water while at the same time discharging only highly concentrated feed water. Once the above described discharge end condition(s) is/are met, the discharge is interrupted and the recirculation steps and interval continue.

For example, a system 10A including a combined displacement pump 19 and displacement motor 16 having a structurally fixed recovery rate of 50% was employed to recirculate a source water having a salinity of about 3000 ppm up to a pressure of about 1000 psi at the high pressure portion 21, 27 at which the feed water with a peak salinity of about 77000 ppm was discharged. About 97% of the source water was thereby extracted as purified water with an average salinity below 400 ppm and about 3% of the source water was discharged as concentrate.

Certain aspects of the invention are described with respect to the following paragraphs:

A reverse osmosis system comprising: a recirculation loop; a combined pump and energy recovery device interposed between a low pressure section of the recirculation loop and a high pressure section of the recirculation loop; an array of at least one reverse osmosis membrane positioned within and in fluid communication with the high pressure section of the recirculation loop; wherein the combined pump and energy recovery device is operable to pressurize an entering fluid from the low pressure section prior to entering the array and to recover energy from an exiting fluid leaving the high pressure section after passing through the array; and wherein the combined pump and energy recovery device is configured to operate substantially free of mixing of the entering fluid and the exiting fluid.

The reverse osmosis system of the paragraph above, wherein the combined pump and energy recovery device is a combined displacement pump and displacement motor.

The reverse osmosis system of any of the paragraphs above, wherein the combined displacement pump and displacement motor includes a double acting piston, wherein the double acting piston includes a front face that is configured to pressurize the entering fluid, and wherein the double acting piston includes a back face configured to recover energy from the exiting fluid.

The reverse osmosis system of any of the paragraphs above, further comprising a discharge outlet within the low pressure section of the recirculation loop, wherein the discharge outlet is operable in an open position to discharge at least a portion of the exiting fluid from the recirculation loop after exiting the combined pump and energy recovery device, and is operable in a closed position to allow the exiting fluid to advance through the low pressure section of the recirculation loop.

The reverse osmosis system of any of the paragraphs above, wherein the discharge outlet includes a valve.

The reverse osmosis system of any of the paragraphs above, wherein the discharge outlet is a two way valve or a three way valve.

The reverse osmosis system of any of the paragraphs above, wherein the recirculation loop comprises a source water supply to replenish a volume flow difference between the fluid entering the array and the fluid exiting the array when the discharge outlet is closed and to advance the fluid out of the discharge outlet when the outlet is open.

The reverse osmosis system of any of the paragraphs above, further comprising a sensor positioned after the array in the high pressure section of the recirculation loop and configured to measure a variable with a known correlation to a salinity of a fluid in the recirculation loop, wherein the discharge outlet is configured to open at a first specified level of the variable.

The reverse osmosis system of any of the paragraphs above, wherein the variable is selected from the group consisting of salinity, conductivity, or pressure.

The reverse osmosis system of any of the paragraphs above, wherein the discharge outlet is configured to close at a second specified level of the variable.

The reverse osmosis system of any of the paragraphs above in combination with any of the elements described in the following claims.

LIST OF REFERENCE NUMBERS

The following reference numbers are used in the specification to identify certain features or steps shown in the drawings:

| Reference Number | Features or Steps |
| --- | --- |
| 1 | prior art reverse osmosis system |
| 2A, 2B, 2N | purified product water separation |
| 2DA | flush beginning pass |
| 2DN | final down mixing pass |
| 3A | return water mixing |
| 3B | feed water mixing |
| 4A, 4N | source water replenishing |
| 4DA, 4DB, 4DN | source water discharge replenishing |
| 5A, 5N | upper volume flow variations |
| 6A, 6N | lower volume flow variations |
| 7A, 7B, 7N | lower salinity increments |
| 8A, 8N | upper salinity increments |
| 9A, 9N | supply water flow |
| 10A | recirculation loop reverse osmosis system |
| 10B | recirculation loop reverse osmosis system |
| 13 | motor |
| 16 | displacement motor |
| 17 | double acting piston |
| 18 | piston rod |
| 19 | displacement pump |
| 20 | membrane array |
| 20A, 20B, 20N | high pressure product water extraction periods |
| 20FB | flush being salinity level |
| 20FE | flush end salinity level |
| 21 | recirculation loop-high pressure portion |
| 23A, 23B, 23N | reverse osmosis membranes |
| 27 | recirculation loop-high pressure portion |
| 29 | recirculation loop-low pressure portion |
| 31 | recirculation loop-low pressure portion |
| 35 | recirculation loop-low pressure portion |
| 38 | source water line |
| 38A, 38N | replenishing periods |
| 41 | discharge line |
| 42 | check valve |
| 43 | solenoid |
| 44 | two way valve |
| 45 | three way valve |
| 47 | feed water sensor |
| 49 | relay |
| 50 | relay |
| 51 | feed water sensor |
| 53 | comparator |
| 54 | product line |
| 56 | concentrate discharge start parameter |
| 57 | concentrate discharge stop parameter |
| 73 | AC power |
| 74 | actuation current |
| 75 | control voltage |
| 81 | maximum salinity |
| DP | discharge salinity level |
| FP | low salinity level |

Accordingly, the scope of the invention described in the Figures and Specification above is set forth by the following claims and their legal equivalent:

What is claimed and desired to be secured by Letters Patent is as follows:

1. A recirculation loop reverse osmosis system capable to recirculate a feed water along a recirculation loop having interposed a number of reverse osmosis membranes while a purified product water extracted from said feed water across the reverse osmosis membranes is replenished by an externally supplied source water, said recirculation loop reverse osmosis system comprising:
   a. a recirculation loop comprising a low pressure portion and a high pressure portion, wherein:
      i. along said low pressure portion is connected a discharge line followed by a source water entrance with respect to a flow direction of said recirculation loop;
      ii. along said high pressure portion is interposed a number of reverse osmosis membranes;
   b. a combined displacement pump and displacement motor that is:
      i. interposed between and pressure wise separating said low pressure portion and said high pressure portion;
      ii. configured to pressurize an entering feed water prior to entering said high pressure portion and advancing said entering feed water into said high pressure portion;
      iii. configured to recover simultaneously a residual pressure of an exiting feed water that is exiting said high pressure portion and advancing said exiting feed water into said low pressure portion;
      wherein said combined displacement pump and displacement motor is configured to process said feed water:
      i. substantially free of mixing said entering feed water and said exiting feed water;
      ii. advancing said entering feed water and said exiting feed water in a structurally defined volume flow difference between them, said structurally defined volume flow difference forcing a structurally defined recovery rate at which purified product water is being extracted across said number of reverse osmosis membranes;
      iii. advancing said entering feed water in a structurally defined volume flow that is in a substantially fixed proportion to an operation speed at which said combined displacement pump and displacement motor is externally driven;
   c. a concentrate discharge start parameter;
   d. a concentrate discharge stop parameter;
   e. a feed water sensor that is configured to sense a feed water condition;

f. a feed water discharger that is configured to:
  i. begin discharging said exiting feed water in response to said sensed feed water condition matching said concentrate discharge start parameter;
  ii. stop discharging said exiting feed water in response to at least one of:
    1. said sensed feed water condition matching said concentrate discharge stop parameter; or
    2. said concentrate discharge stop parameter being met.

2. The recirculation loop reverse osmosis system of claim 1, wherein said feed water discharger is configured to discharge a substantial entirety of said exiting feed water at a reverse osmosis peak operating salinity that has accumulated at the exit of a last one of said reverse osmosis membranes with respect to a flow direction of said feed water within said recirculation loop.

3. The recirculation loop reverse osmosis system of claim 1, wherein said feed water discharger comprises a two way solenoid valve positioned along a recirculation loop discharge line.

4. The recirculation loop reverse osmosis system of claim 1, wherein said feed water discharger comprises a three way solenoid valve positioned at a junction of a discharge line and said low pressure portion.

5. The recirculation loop reverse osmosis system of claim 1, wherein said concentrate discharge start parameter comprises a reverse osmosis peak operating pressure of said reverse osmosis membrane at a structurally defined feed water volume flow in conjunction with a predetermined feed water temperature and a predetermined feed water salinity, and wherein said feed water sensor is a pressure switch.

6. The recirculation loop reverse osmosis system of claim 5, wherein said reverse osmosis peak operating pressure is above 500 psi.

7. The recirculation loop reverse osmosis system of claim 5, wherein said concentrate discharge stop parameter is a time interval parameter that is predetermined in conjunction with a water volume of a flushable portion of said recirculation loop divided by said structurally defined feed water volume flow such that a predetermined discharge volume of said feed water is discharged by the feed water discharger.

8. The recirculation loop reverse osmosis system of claim 7, wherein:
  a. said feed water discharger comprises a solenoid valve; and
  b. said time interval parameter is executed by a time delay relay such that following said concentrate discharge start parameter being executed by said pressure switch said time interval parameter is being executed by said time delay relay while passing an electric actuation current onto said solenoid valve.

9. The recirculation loop reverse osmosis system of claim 7, wherein said time interval parameter is predetermined such that said discharged feed water is in its substantial entirety of a reverse osmosis peak operating salinity in between when the feed water discharger begins discharging said exiting feed water and stops discharging said exiting feed water.

10. The recirculation loop reverse osmosis system of claim 9, wherein said reverse osmosis peak operating salinity is above 50000 ppm.

11. The recirculation loop reverse osmosis system of claim 9, wherein said reverse osmosis peak operating salinity is above 75000 ppm.

12. The recirculation loop reverse osmosis system of claim 1, wherein at least one of said concentrate discharge start parameter and said concentrate discharge stop parameter is a predetermined water conductivity, and wherein said feed water sensor is a conductivity sensor.

13. The recirculation loop reverse osmosis system of claim 12, wherein:
  a. said feed water discharger comprises a solenoid valve;
  b. a relay is connected to said solenoid valve for passing an electric actuation current onto it; and
  c. a logic comparator stores at least one of said concentrate discharge start parameter and said concentrate discharge stop parameter, the logic comparator connected to said conductivity sensor and said relay, and the logic comparator configured to pass on a control voltage to said relay to selectively energize said solenoid valve in response to a sensed feed water conductivity matching at least one of said concentrate discharge stop parameter or said concentrate discharge start parameter.

14. The recirculation loop reverse osmosis system of claim 12, wherein said predetermined water conductivity of said concentrate discharge start parameter corresponds to a water salinity of above 50000 ppm.

15. The recirculation loop reverse osmosis system of claim 12, wherein said predetermined water conductivity of said concentrate discharge start parameter corresponds to a water salinity of above 75000 ppm.

16. A method for recovering a portion of purified water from feed water via a reverse osmosis membrane, the method comprising the steps of:
  a. recirculating in a flow direction a feed water along a low pressure portion and a high pressure portion of a recirculation loop;
  b. pressurizing prior to entering said high pressure portion said feed water in a structurally defined volume flow that is in a substantially fixed proportion to a pressurization speed;
  c. pressure harvesting a structurally fixed volume fraction of said feed water exiting said high pressure portion;
  d. during step c) forcing a volume flow difference between said feed water entering said high pressure portion and said feed water exiting said high pressure portion as purified product water across a number of reverse osmosis membranes interposed along said high pressure portion;
  e. during step d) replenishing said volume flow difference along said low pressure portion with a source water;
  f. repeating steps a) to e) until a discharge condition of said feed water within said recirculation loop is met;
  g. when the discharge condition is met, interrupting the recirculation loop and discharging said feed water at an end of said interrupted recirculation loop with respect to said flow direction within said interrupted recirculation loop while replenishing with supply water said volume flow difference and said discharged feed water at a beginning of said interrupted recirculation loop with respect to said flow direction along an infeed side of said low pressure portion;
  h. continuing step g) until a discharge end condition of said feed water within said recirculation loop is met; and
  i. continuing with steps a) to e) when the discharge end condition is met.

17. The method of claim 16, wherein at least one of said discharge condition or said discharge end condition is a feed water pressure within said high pressure portion.

18. The method of claim 16, wherein said discharge end condition is a time delay from the beginning of step g).

19. The method of claim 16, wherein at least one of said discharge condition or said discharge end condition is a feed water conductivity within said recirculation loop.

\* \* \* \* \*